United States Patent Office 3,214,369
Patented Oct. 26, 1965

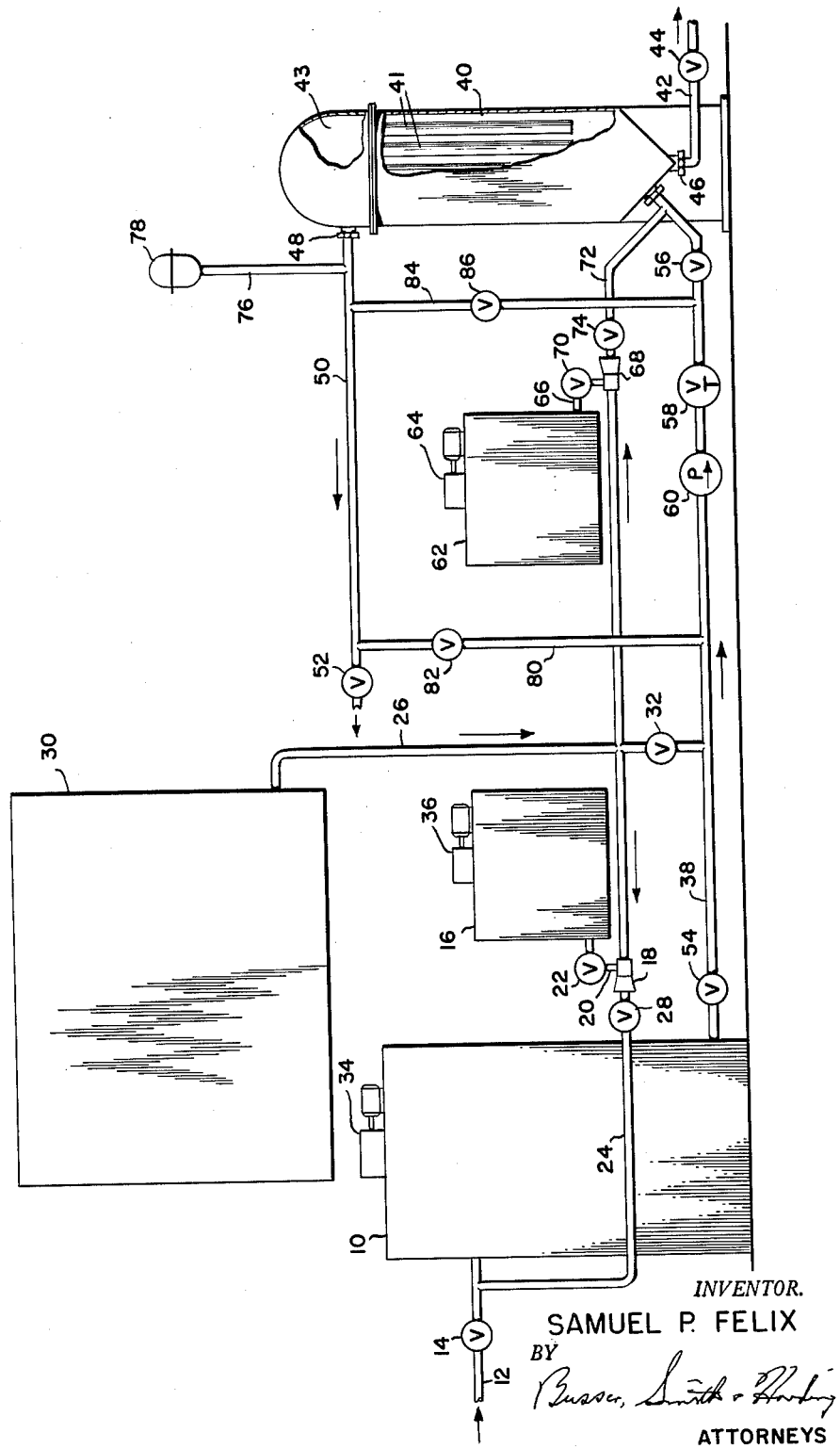

3,214,369
METHOD OF REMOVING VIRUS FROM WATER
Samuel P. Felix, Palo Alto, Calif., assignor, by mesne assignments, to De Laval Turbine Inc., Trenton, N.J., a corporation of Delaware
Filed Dec. 21, 1961, Ser. No. 161,157
1 Claim. (Cl. 210—24)

This invention relates to a filtering process and apparatus for the removal of virus from contaminated water.

Since viruses are difficult to detect, their removal cannot be determined with certainty. Moreover, chlorination is not always effective in destroying viruses as contrasted with bacteria. One effective technique for virus removal from water involves chemical flocculation which results in the formation of a metal-virus complex which aggregates to form a separable precipitate. The formation of the metal-virus complex appears to be the result of a metal cation-protein ion reaction. The use of iron or aluminum salts, such as iron sulfate or aluminum sulfate, for the formation of the metal virus salts has been found to provide satisfactory results. The virus is not destroyed by the flocculant but is concentrated in the floc.

In accordance with prior methods of removing the virus by flocculation, after the metal-virus complex was formed and aggregated to form a precipitate, the precipitate was detained in a coagulating basin to allow the coagulant to form aggregates of a sufficient size so that they would settle out by gravity. In this settling method, the size of the coagulating and settling tank must be large enough to slow the liquid velocity so that settling can take place. Thus, in the case of the public water supplies where large volumes of water must be handled, coagulating and settling tanks of extremely large sizes are required. Moreover, detention times of approximately three hours are normally involved in these settling methods.

It is an object of this invention to provide a filtering process and apparatus involving the use of a filter, such as the diatomaceous earth type, for the removal of virus from water. The method in accordance with this invention makes use of the fact that the metal-virus complex formation is an ionic reaction which occurs instantaneously. Broadly speaking, the present invention involves admixture of the raw water and the flocculating agent in a detention tank for a very short time, only sufficient to insure uniform admixture of the contents and passing the liquid from the detention tank through a diatomaceous earth filter which removes the floc containing the virus. The detention time need only be sufficient to permit the metal-virus complex to aggregate to a size large enough to be filterable by the diatomaceous earth filter, which can remove particles of very small sizes (though it would not remove the unmodified virus).

The above and other objects and features of the invention will become apparent from the following description read in conjunction with the accompanying drawing in which the single figure is a diagrammatic illustration of a filtering system provided in accordance with this invention.

The raw water is delivered to a detention tank 10 through a line 12, having a control valve 14 connected therein. A body feed tank 16 is provided and contains a slurry comprising pre-flocked diatomaceous earth and a heavy metal salt which is preferably iron sulfate. The diatomaceous earth should make up 4 to 20 percent by weight of the mixture. It will be apparent that other metal cation flocculating agents may be used in substitution for or in addition to iron sulfate, as for example aluminum sulfate, those used being, of course, non-toxic. In the body feed tank, the iron sulfate hydrolyzes and deposits on the diatomaceous earth. The body feed tank 16 is connected to an eductor 18 through a line 20 having a control valve 22 connected therein. The eductor 18 is connected in a line 24 which is connected between a line 26 and inlet line 12 and has a control valve 28 connected therein. Line 26 is connected to tank 30 which is elevated to provide a large pressure head on the rest of the apparatus and contains clean water which is supplied from the ultimate reservoir. Line 26 has a control valve 32 connected therein. The slurry in tank 16 is drawn therefrom by the flow of liquid passing from the storage tank 30 through line 26 and line 24 through the eductor 18. Thus, there may be provided in tank 10 a mixture of raw water and the body feed slurry comprising the preflocked diatomaceous earth and iron sulfate. A conventional mixer 34 is mounted on detention tank 10 and serves to agitate the liquid contained therein in order to provide for good mixing of the raw water and the slurry from the body feed tank 16. A similar mixer 36 is mounted on body feed tank 16 for agitating the slurry therein.

A line 38 is connected between the outlet of the detention tank 10 and the inlet of a filter 40. The filter 40 may be of any suitable type adapted for filtration by the use of diatomaceous earth. This type of filter generally comprises a tank which contains a plurality of tubular filter elements 41. The tubular filter elements are positioned throughout the tank cross-section, each comprising a mesh tube closed at its bottom end and open at its upper end for communication with the upper outlet chamber 43 of the filter. The tank has a conical lower section terminating in an outlet connection 46 by which the tank may be drained by way of a line 42 controlled by a drain valve 44. An outlet connection 48 communicates with the outlet chamber 43 of the filter and is connected to a clean water storage tank or reservoir (not shown) by a line 50 controlled by a valve 52. The clean water may be pumped from this storage tank or reservoir for use.

The line 38 has a control valve 54 connected therein adjacent to the outlet of detention tank 10 and a control valve 56 connected therein adjacent to the inlet to the filter 40. Line 38 also has a throttle valve connected therein upstream of the valve 56. A pump 60 is provided upstream of valve 58 for delivering the contents of line 38 into the filter 40. Line 26 communicates with line 38 at a location between pump 60 and valve 54.

A precoat tank 62 is provided and contains a precoat slurry of diatomaceous earth. A mixer 64 is provided for agitating the contents of tank 62. The precoat slurry is delivered to the inlet of the filter 40 through a line 66, which is connected to the suction inlet of an eductor 68 and has a control valve 70 connected therein, and a line 72 which is connected to line 38 upstream of the filter inlet and is also connected to line 26 at its opposite end. Line 72 has a control valve 74 connected therein downstream of the eductor 68. Thus, liquid flowing from the clean water storage tank 30 through line 26, line 72, and eductor 68 draws liquid from the precoat tank 62 and delivers the same to the filter 40. The precoat slurry in tank 62 contains a filter aid of diatomaceous earth. The precoating operation involves the feeding of a large amount of filter aid into the filter in a short time to form a precoat of about one-sixteenth of an inch on the filter elements. The diatomaceous earth bridges the openings of the filter elements and builds up a precoating of filter cake.

Line 50 has connected thereto a line 76 which is connected to the lower portion of an automatic vent valve 78 of the float type which closes after the liquid therein reaches a certain level and permits the escape and entry of the air when the liquid is below the shut-off level. A recirculating line 80, which has a control valve 82, is connected between the lines 50 and 38 to provide communication therebetween for recirculation through the filter 40 as will be described hereinafter. A backwashing line 84 is connected between line 50 and line 38 at a point downstream of the pump 60 to provide communication between lines 50 and 38 for backwashing the filter 40 as will be described hereafter. A backwash valve 86 is connected in line 84 to control the flow therethrough.

In the operation of the apparatus in accordance with this invention, the raw water is delivered continuously to the tank 10 through line 12 with inlet valve 14 being open. The body feed slurry in tank 16, which comprises pre-flocked diatomaceous earth and a metal cation flocculating agent, preferably iron sulfate, is fed continuously into the raw water through line 20, eductor 18, valve 28, and line 24 by the action of the clean water passing through the eductor 18 by way of lines 26 and 24. Within tank 10 the metal cation-protein reaction takes place instantaneously forming a metal-virus complex which aggregates to form a precipitate. While the flow is continuous through tank 10, the raw water, diatomaceous earth and iron sulfate remain in the tank 10 for an average detention time of from two to ten minutes in order to secure adequate admixture thereof and to permit aggregation of the metal-virus complex to a size large enough to be filtered by the precoated diatomaceous earth filter 40.

The contents of tank 10 are delivered to the filter 40 through line 38 by the operation of pump 60, valves 54 and 56 being open and throttle valve 58 being set to the desired flow rate. Prior to this, the filtering elements have been precoated with diatomaceous earth which prevents any virus-laden aggregates from reaching the clean inside of the filter tubes. Thus, the virus is removed from the water by the filtering action of the precoat layer and the clean filtrate is delivered through line 50 and valve 52 to the clean storage tank or reservoir. During this filtering operation, only the valves 54, 58, 56 and 52 are open, the remaining valves being closed. The filtering operation will continue until the size of the filter cake on the filtering elements prevents an efficient filtering operation by reason of the excessive pressure drop across the filter cake.

The filter must then be renewed to place the same in condition for a subsequent filtering operation. It is important that this renewal procedure be such that none of the virus salts can pass through the filtering elements since these salts are equally as dangerous as the virus.

The first step in renewing the filter coating comprises pressurization of the filter. During this step, all the valves are closed with the exception of valves 54, 56 and 58. The pump 60 is then operated to deliver liquid into the filter 40 and, since the outlet valve 52 is closed, air is trapped in the upper end of outlet chamber 43 above the outlet connection 48 and is compressed by the action of the pump 60.

The next step is known as the bump and drain step during which all of the valves are closed with the exception of inlet valve 54, 56 and drain valve 44. When the valve 44 is opened, the compressed air in the upper end of the filter 40 provides a sudden high velocity surge of the liquid through the filter tubes in a reverse flow direction thereby to dislodge the filter cake therefrom. The dislodged filter cake containing the virus salts will thus be washed outwardly through the drain line 42.

The next step is to fill and pressurize the filter 40. During this step only the valves 32, 58 and 86 are open. Pump 60 is operated to draw clean liquid from tank 30 and pump the same through valve 58, line 84, and valve 86 to fill and pressurize the filter 40.

The next step is known as the bump and rinse step which involves the opening of the drain valve 44 whereby there is a sudden surge of liquid reversely through the filter tubes and the liquid contained in tank 40 passes through the drain line 42. This second sudden surge through the filter tubes is to insure that all of the filter cake is removed from the filter tubes. The rinsing of the filter is continued since the valves 32, 58 and 86 remain open. Thus, clean water passes from the tank 30 through lines 26, 38, 84, 50 and connection 48 through the filter tubes into the inlet chamber of the filter and outwardly through the drain line 42. This rinsing serves to clean the interior of the filter 40 and remove any small particles of filter cake which may not have been removed by the previous draining steps. It may be noted that all of the rinsing and filling is carried out by means of clean water. Thus, there is no danger that the outlet side of the filtering elements will become contaminated.

The next step is to completely drain the filter 40. During this step the valves 56 and 86 are closed to prevent any filling of the tank 40 and the drain valve 44 is open to permit complete draining of the filter 40.

The next step is to rinse and drain the filter. During the initial portion of this step, the pump 60 is operated with the valves 32, 58, 86 and 44 open. Thus, clean water is passed from the clean water tank 30 through lines 26, 38, 84, 50 and connection 48 through the filter and out through drain line 42 thereby to backwash the filter again. At the end of this step, valve 86 is closed whereby the liquid in filter 40 will completely drain therefrom through line 42, air entering through vent 78. This final rinsing and draining provides additional insurance that the filter 40 is free of contaminated filter cake.

The next step is that of precoating in which all of the valves are closed with the exception of valve 70 and valve 74. Thus, clean liquid passes through line 26, eductor 68 and line 72 to withdraw the precoating slurry from tank 62 through line 66 and valve 70 and deliver the same into the filter 40. This step involves injecting a preset amount of diatomaceous earth into the filter 40 to partially fill the same.

The next step is filling and recirculation, during which the valves 32, 58, 56 and 82 are the only valves which are open. Pump 60 is operated to draw clean liquid through lines 26 and 38 and pump the same into the filter 40 from which the liquid passes through line 50 into line 80 which returns the liquid to line 38 for recirculation by the pump 60. The pump 60 serves to recirculate the precoat suspension until all of the precoat is deposited on the filter tubes. During the filling and recirculating step, clean liquid is drawn through lines 26 and 38 and delivered into the system until the filter 40 is filled.

In the precoating step and in the initial stages of the filling and recirculating step, filter aid will pass through the filter elements into the filter outlet chamber until a sufficient depth of precoat is formed thereon. The recirculating step serves to allow the filter aid to bridge the openings in the screen and to form a filter cake. Clean water is used for recirculating since there will not be any effective filtering until the precoat layer is built up on the filter tubes. The recirculating is continued until all of the filter aid is deposited on the precoat layer. The filter is now ready for the filtering step as was described previously.

The renewal of the filter cake on the filtering elements takes approximately fifteen minutes, so that the filtering is only interrupted for a short period of time. It will be apparent that all of the sequential operations of the valves described above may be accomplished by a suitable control system which will operate automatically. The renewal operation described above insures that there will be no contamination of the inlet side of the filter 40 by reason of the blowdown of the tubes and the rinsing steps described above which are accomplished by the use of clean water.

An alternate mode of operation may involve the introduction of the metal cation flocculant to raw water as it leaves the detention tank. Thus, only the pre-flocked diatomaceous earth is added to the raw water in the detention tank. In this system reliance is placed on the preflocked diatomaceous earth to form aggregates consisting of suspended particles in the raw water. When the metal cation flocculant is subsequently introduced, the metal-virus complex will be entrapped in these aggregates while going through the filter pump, the filter piping and the interior of the filter 40 prior to reaching the filtering elements. The aggregates will then be removed from the water by the operation of filter 40.

It may be noted that the virus removal method in accordance with this invention should not ordinarily be used without adequate chlorination. This invention is primarily used as a supplementary safeguard with respect to the viruses.

As will be evident, various modifications of details may be made without departing from the scope of the invention as defined by the following claim.

What is claimed is:

The method of removing virus from water which comprises the steps of delivering raw water to the inlet of a filter, adding a body feed of diatomaceous earth to the raw water prior to entrance thereof into the filter, adding a metal cation flocculating agent to the raw water prior to entrance thereof into the filter whereby a metal-virus complex is formed, maintaining said mixture of said raw water, said body feed and said flocculating agent a time sufficient to permit the formation of aggregates to a size large enough to be filtered from said raw water by said filter, said aggregates comprising metal-virus complex particles, passing said mixture through said filter for removing said aggregates from the water, said filter being of a type having a filtering medium therein dividing the filter into an inlet chamber and an outlet chamber and having a layer of filter cake adhering to the inlet side of the filtering medium for removing the particles from the raw water during filtration, and renewing the filter cake on said filtering medium after a filtering run, said last-named step comprising the sequential steps of dislodging the filter cake from said filtering medium and removing the filter cake from the filter; said filter cake dislodging and removal comprising the sequential steps of pressurizing the filter, suddenly releasing said pressure and draining the filter through a drain line communicating with the inlet chamber, pressurizing the filter again, suddenly releasing said pressure and rinsing the filter with clean water by passing clean water into the filter outlet chamber, from said outlet chamber through said filtering medium into said inlet chamber, and from said inlet chamber into a drain line, and draining the filter in preparation for precoating; adding a precoating slurry to the inlet chamber of said filtering medium, and recirculating said precoating slurry by recirculating clean water through said filter until a precoating layer is built up on the inlet side of said filtering medium.

References Cited by the Examiner

UNITED STATES PATENTS

| | | | |
|---|---|---|---|
| 914,887 | 3/09 | Schultze | 210—50 |
| 935,695 | 10/09 | Schultze | 210—42 X |
| 2,468,188 | 4/49 | Frankenhoff | 210—75 |
| 2,652,152 | 9/53 | Frankenhoff | 210—75 |
| 2,862,622 | 12/58 | Kircher et al. | 210—75 X |

OTHER REFERENCES

Babbitt et al.: Effect of Body Feed on the Filtration of Water Through Diatomite, Univ. Ill. Eng. Expt. Sta. Bull. No. 425, 1954, 40 pp., also cited in Chem. Abst., vol. 49, 1955, page 4914.

Clarke et al.: Enteric Viruses in Water, Jour. AWWA, October 1959, vol. 51, pp. 1299–1317.

Pettersen: Automatic Diatomaceous-Earth Filters, Jour. New England Water Works Assoc., vol. 74, September 1960, pp. 245–249.

MORRIS O. WOLK, *Primary Examiner.*